R. J. Hill.
Fertilizer.
No. 28,173.   Patented May 8, 1860.

Witnesses.
Edw. F. Brown.
Jno. W. Downing

Inventor:
R. J. Hill

UNITED STATES PATENT OFFICE.

ROBERT J. HILL, OF AMERICUS, GEORGIA.

IMPROVEMENT IN MACHINES FOR SOWING FERTILIZERS.

Specification forming part of Letters Patent No. 28,173, filed May 8, 1860.

*To all whom it may concern:*

Be it known that I, ROBERT J. HILL, of Americus, in the county of Sumter, State of Georgia, have invented a new and useful improvements in carts for spreading rotten cotton-seed, manure, bone-dust, and other fertilizers; and the following is a clear and exact description of the same, reference being had to the accompanying drawings, and the letters of reference thereon, making a part of this specification.

Figure 2:
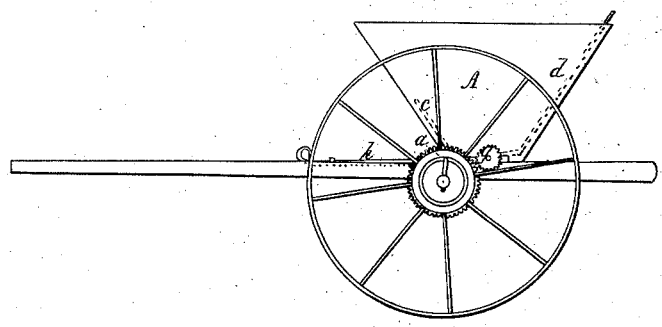
Figure 1:
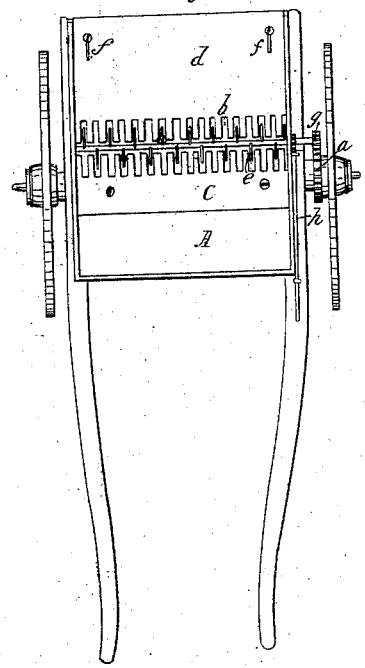
Figure 3:
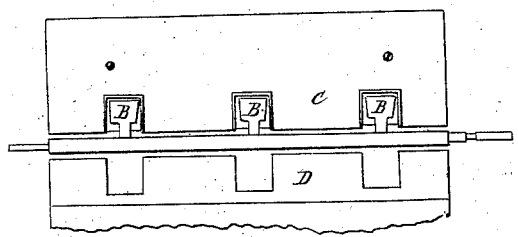

Figure 1 represents a top view. Fig. 2 is a side elevation, showing the gear-wheels and shape of the body. Fig. 3 shows a series of the hoes to be used in the place of the hooks when desired.

The nature of my invention consists in the arrangement of a series of hooks, (and small hoes,) made to revolve at the bottom of a hopper, which forms the body of the cart, by a spur-gear connecting with one of the wheels in such manner as to discharge the contents evenly over the surface of the ground; and when the hooks are removed and the hoes substituted the contents will be discharged in small heaps spaced off at about equal distances.

To enable others skilled in the art to make and use my invention, I will proceed to describe it more fully and its mode of operation.

The shafts, axle, and wheels of a common horse-cart can be used by putting a spur-gear wheel upon one of the hubs, as seen at *a* in Fig. 2, the square body removed, and a hopper, A, with the opening *b* at the bottom, which is partly closed by a plate of metal, *c*, having spaces through it to allow the revolving hooks *e e e* to pass. There is also on the opposite side of the hopper A a similar plate, *d*, made to slide on two slits, *f f*, to open and close the opening, and thereby discharge a larger or smaller quantity. When the small pinion *g* is thrown out of gear by the sliding rod *h* the hooks *e' e' e'* cease to act on the material to liberate it.

The small hoes B B B, as seen in Fig. 3, may be placed in the opening at the bottom of the hopper A, with the slides C and D to match, leaving openings or spaces for them to pass in their revolutions, which may be geared so as to discharge the materials in any given quantity, according to the size of the hoes B, and their spaces at equal distances on the ground— say three feet, more or less—as desired.

The great need of some mechanical agency to distribute rotten cotton-seed uniformly in hills or broadcast on the surface in cotton-growing sections has long been felt, and it is confidently believed that the wants of the South in that respect may be fully supplied by the introduction of my invention, as above described, it being so simple and efficient that the most illiterate and common field-hands can understand and manage it perfectly. It can also be constructed in a very economical manner, and placed upon or attached to any cart and displaced readily to admit of the cart being used for other purposes.

Having thus described my invention and its operation, what I claim as new, and desire to secure by Letters Patent, is—

The arrangement of the revolving hooks *e e* and small hoes B B, the sliding plates C and D to regulate the openings, and the sliding rod and bearing on the shaft to connect and disconnect the pinion *g* with the wheel of the cart, as specified, for the purposes set forth.

R. J. HILL.

Witnesses:
   EDM. F. BROWN,
   JNO. W. DOWSING.